H. F. JENKS.
Sash-Supporter.
No. 6,256.
Reissued Jan. 26, 1875.
Fig. 4.
Fig. 2.
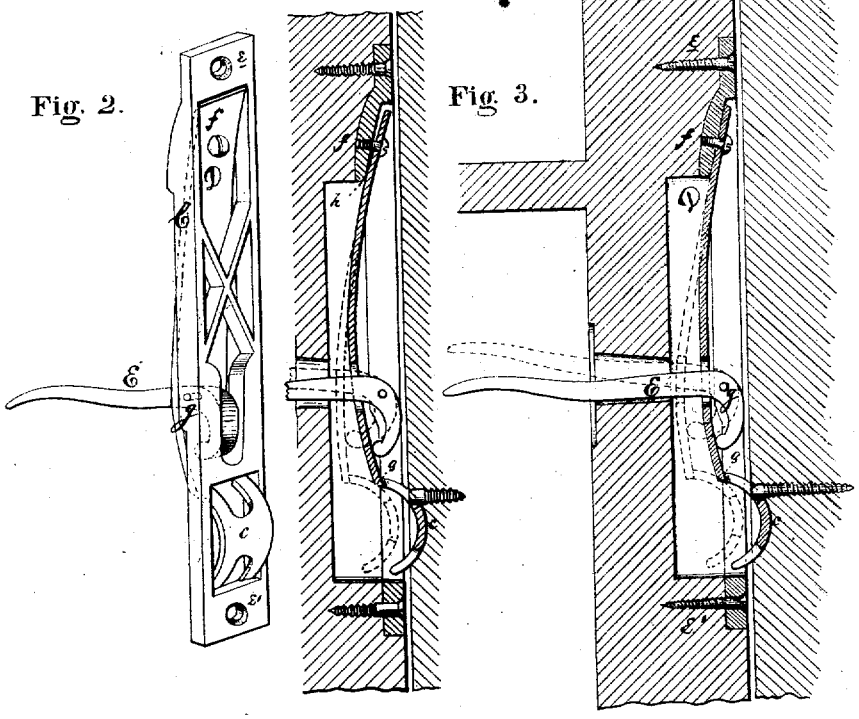
Fig. 3.
Fig. 1.
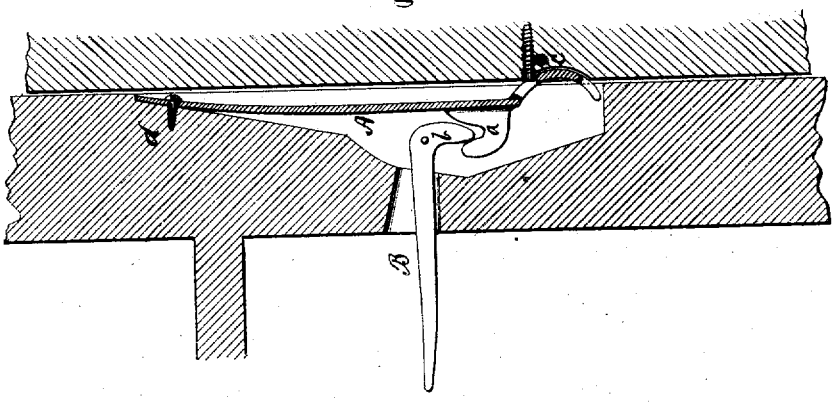
WITNESSES.
O. S. Rosenth
John B. Gruwell
INVENTOR.
Henry F. Jenks.
THE GRAPHIC CO. PHOTO-LITH. 39 & 41 PARK PLACE, N.Y.

UNITED STATES PATENT OFFICE.

HENRY F. JENKS, OF PAWTUCKET, ASSIGNOR, BY MESNE ASSIGNMENTS, OF ONE-HALF INTEREST TO DANIEL H. ARNOLD, OF LINCOLN, R. I.

IMPROVEMENT IN SASH-SUPPORTERS.

Specification forming part of Letters Patent No. 46,472, dated February 21, 1865; reissue No. 6,256, dated January 26, 1875; application filed June 15, 1874.

*To all whom it may concern:*

Be it known that I, HENRY F. JENKS, of Pawtucket, in the county of Providence and State of Rhode Island, have invented a new and useful Improvement in Window-Sash Supporters; and it is hereby declared that the following specification, taken in connection with the drawings, making a part of the same, is a full, clear, and exact description thereof.

Figure 1 is a sectional view of the sash-supporter patented to Geo. F. Foster, April 11, 1848, and upon which the invention herein described is an improvement. Fig. 2 is a view, in perspective, of my improved sash-supporter. Fig. 3 is a vertical section in a plane through the window-sash and the window-frame. Fig. 4 illustrates the mode of adjusting the operative pressure of the spring.

The invention relates to that variety of supporters for window-sashes by means of which the sash can be held at any desired point in the window-frame, instead of at certain fixed points only; and consists in certain improvements upon the supporter for this purpose patented to Geo. F. Foster, April 11, 1848.

In order that these improvements may be understood, it will be necessary to refer to the construction of the Foster supporter shown in Fig. 1. It consists of a spring, A, and a finger-piece, B, detached from each other except when combined together and adjusted in the window-sash. Upon the back of the spring A is placed a hooked-shaped piece, *a*, against which the short arm, *b*, of the finger-piece bears for the purpose of operating the spring, which, except when withdrawn by raising the finger-piece lever, constantly presses against the window-frame with its curved face *c*, and, by friction, enables the sash to be sustained at any height.

It will be observed that the spring is secured directly to the window-sash at *d*, having no frame to which it is attached, and the finger-piece has its fulcrum upon a pin which passes through the stile. From these two facts have arisen the principal objections to this supporter, which, in other respects, is considered the most desirable of its kind in use. In the first place, the method of attaching the spring to the sash is objectionable on account of the liability of the threads of the screw to tear out the soft wood into which they enter from the effect of the tension of the spring, and also because the mode of attachment provides no practicable means of varying the tension of the spring, so as to adjust it to window-sashes of different weights, it being very desirable that the spring should not be stiffer than is necessary to support the sash. In the second place, it requires the services of a skilled workman, and the expenditure of much time to apply one of these supporters to a window-sash, for the reason that there are no means for determining the place in the sash at which the hole for the fulcrum-pin of the finger-piece shall be made, except by the most careful measurement.

It is proposed to remedy these objections to the supporter above described by combining the spring and finger-piece with a frame, whereby the strain and resistance incident to working the finger-piece is borne by the frame instead of being brought upon the sash, and the apparatus, being a complete organization in itself, can be, without difficulty, fitted by any ordinary workman to the sash.

In the accompanying drawings, C, Fig. 2, is a rectangular frame, which is let into the stile of the sash and held by screws *e e'*, as shown in Fig. 3, a mortise or recess being cut back of the same of sufficient depth to allow of the working of the spring D, which is attached to the frame at *f*, and which operates to hold the sash at different positions. The tension of the spring can be easily varied by slackening the screw *f*, so as to accommodate window-sashes of different weights.

In Fig. 3 the spring is shown to be fully strained, so as to exercise its greatest holding power, as evidenced by the fact that the base of the spring is in full contact with that surface of the plate which is adjacent to the screw *f*. In Fig. 4, however, it will be seen that there remains a space between the end of the spring and said surface, although the spring is sufficiently strained when in that position to support a light window. At the lower side of the curved face *c* the front of the spring is in contact with the rear of the plate at the lower edge, as at *g*, of the opening through which said curved face protrudes. In Fig. 4 the spring near the curved face is also in contact with the plate, as in Fig. 3, but at the base the spring is only in contact with the plate at the edge at *h*. The power of the spring can therefore be increased by turning the screw and bringing the coincident faces of spring and plate at that point into closer contact without thereby causing the curved face of the spring to be farther protruded through its opening in the plate.

E is the finger-lever which operates the spring D, as shown in section at Fig. 3, and instead of having its fulcrum upon a pin which passes through the stile of the sash it has its fulcrum at *g* in the frame C.

In other respects the apparatus is similar to that patented to the said Foster, and above described.

What is claimed as the invention of the said HENRY F. JENKS is—

The window-sash supporter, composed of the frame C, the spring D, and the finger-lever E, in combination, substantially as described, for the purposes specified.

HENRY F. JENKS.

Witnesses:

O. L. BOSWORTH,
JOHN B. GRINNELL.